United States Patent
Chen et al.

(10) Patent No.: US 12,181,754 B2
(45) Date of Patent: Dec. 31, 2024

(54) DISPLAY PANEL, MANUFACTURING METHOD THEREOF AND DISPLAY DEVICE

(71) Applicants: Beijing BOE Display Technology Co., Ltd., Beijing (CN); BOE Technology Group Co., Ltd., Beijing (CN)

(72) Inventors: Dongchuan Chen, Beijing (CN); Jun Fan, Beijing (CN); Xi Chen, Beijing (CN); Tianyu Xu, Beijing (CN); Kaixuan Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/769,948

(22) PCT Filed: May 19, 2021

(86) PCT No.: PCT/CN2021/094523
§ 371 (c)(1),
(2) Date: Apr. 18, 2022

(87) PCT Pub. No.: WO2021/258929
PCT Pub. Date: Dec. 30, 2021

(65) Prior Publication Data
US 2024/0142831 A1    May 2, 2024

(30) Foreign Application Priority Data
Jun. 24, 2020 (CN) .......................... 202010590545.8

(51) Int. Cl.
*G02F 1/1343* (2006.01)
*G02F 1/1333* (2006.01)
(Continued)

(52) U.S. Cl.
CPC .... *G02F 1/13439* (2013.01); *G02F 1/133345* (2013.01); *G02F 1/133377* (2013.01);
(Continued)

(58) Field of Classification Search
CPC .............. H04N 23/57; G02F 1/136286; G02F 1/133555; H04M 1/0264
See application file for complete search history.

(56) References Cited

U.S. PATENT DOCUMENTS

2011/0069254 A1* 3/2011 Takama .................. G02B 3/14
349/62
2015/0077669 A1* 3/2015 Wu ................... G02F 1/133512
349/33
(Continued)

FOREIGN PATENT DOCUMENTS

CN       102037395 A     4/2011
CN       103345096 A    10/2013
(Continued)

OTHER PUBLICATIONS

CN 202010590545.8 first office action.
PCT/CN2021/094523 international search report and written opinion.

*Primary Examiner* — Jessica M Merlin
(74) *Attorney, Agent, or Firm* — IPro, PLLC

(57) ABSTRACT

A display panel, a manufacturing method thereof, and a display device are provided. The display panel includes a display region and a lens region, wherein the lens region comprises a common electrode and a deflection electrode arranged opposite each other, and a first liquid crystal layer arranged therebetween, the deflection electrode is configured for providing at least two different deflection voltages, and the at least two different deflection voltages are configured for deflecting the first liquid crystal layer. According to the display panel, the manufacturing method thereof and the (Continued)

display device in the embodiments of the present disclosure, it may drive the liquid crystals to deflect, so as to achieve the function of zooming of the camera. In addition, the camera is integrated with the display panel, so as to improve the integration level of the display device, and facilitate the utilization and the manufacturing of the display device.

14 Claims, 1 Drawing Sheet

(51) Int. Cl.
*G02F 1/1335* (2006.01)
*G02F 1/1339* (2006.01)
*G02F 1/1341* (2006.01)
*H04M 1/02* (2006.01)
*H04N 23/57* (2023.01)

(52) U.S. Cl.
CPC .. *G02F 1/133512* (2013.01); *G02F 1/133514* (2013.01); *G02F 1/133526* (2013.01); *G02F 1/1339* (2013.01); *G02F 1/13394* (2013.01); *G02F 1/1341* (2013.01); *G02F 1/134309* (2013.01); *H04N 23/57* (2023.01); *H04M 1/0264* (2013.01)

(56) References Cited

U.S. PATENT DOCUMENTS

| | | |
|---|---|---|
| 2019/0310501 A1 | 10/2019 | Nagata et al. |
| 2021/0200009 A1 | 7/2021 | Wang et al. |

FOREIGN PATENT DOCUMENTS

| | | | | |
|---|---|---|---|---|
| CN | 108398828 A | | 8/2018 | |
| CN | 109188824 A | | 1/2019 | |
| CN | 109239997 A | * | 1/2019 | ....... G02F 1/134309 |
| CN | 109656049 A | | 4/2019 | |
| CN | 110361885 A | | 10/2019 | |
| CN | 110632802 A | | 12/2019 | |
| CN | 110928016 A | | 3/2020 | |
| CN | 111610671 A | | 9/2020 | |
| CN | 111965906 A | | 11/2020 | |
| JP | 2007256473 A | | 10/2007 | |

* cited by examiner

DISPLAY PANEL, MANUFACTURING METHOD THEREOF AND DISPLAY DEVICE

CROSS-REFERENCE TO RELATED APPLICATIONS

This application is the U.S. national phase of PCT Application No. PCT/CN2021/094523 filed on May 19, 2021, which claims priority to Chinese Patent Application No. 202010590545.8 filed in China on Jun. 24, 2020, the entire contents of which are hereby incorporated by reference.

TECHNICAL FIELD

The present disclosure relates to display technical fields, in particular to a display panel, a manufacturing method thereof and a display device.

BACKGROUND

With the development of technology, cameras are applied in more and more display devices. However, in the prior art, the camera typically is an independent component and achieves zooming through a mechanical structure. The integration of the camera with other components in display device is low, and the installation and use of the camera are inconvenient.

SUMMARY

In one aspect, the present disclosure provides a display panel including a display region and a lens region, wherein the lens region includes a common electrode and a deflection electrode arranged opposite each other, and a first liquid crystal layer arranged between the common electrode and the deflection electrode, the deflection electrode is configured for providing at least two different deflection voltages, and the at least two different deflection voltages are configured for deflecting the first liquid crystal layer.

Optionally, the deflection electrode includes a first sub-electrode and a second sub-electrode that are insulated from each other and spaced apart from each other, and the second sub-electrode is arranged around the first sub-electrode.

Optionally, the first sub-electrode is of a circle and the second sub-electrode is of a ring.

Optionally, t the display region of the display panel includes a second liquid crystal layer, the first liquid crystal layer and the second liquid crystal layer are arranged at a same layer, and the first liquid crystal layer and the second liquid crystal layer are separated from each other by an isolation structure.

Optionally, the isolation structure includes a barrier that is formed of sealant.

Optionally, the isolation structure further includes a photo spacer, the photo spacer being arranged at a side of the barrier proximate to the first liquid crystal layer.

Optionally, the display panel includes an array substrate and a color filter substrate that are arranged oppositely to form a cell, and one of the common electrode and the deflection electrode is arranged on the array substrate, and the other is arranged on the color filter substrate.

Optionally, the array substrate further includes a display region common electrode arranged on the display region; the common electrode is arranged on the array substrate, and the common electrode and the display region common electrode are arranged at a same layer and made of a same material; or the deflection electrode is arranged on the array substrate, and the deflection electrode and the display region common electrode are arranged at a same layer and made of a same material.

Optionally, the display panel further includes a black matrix and an electrode line that are arranged on a color filter substrate, the common electrode and/or the deflection electrode being electrically connected to the electrode line, the orthographic projection of the electrode line on the color filter substrate being within the range of the orthographic projection of the black matrix on the base substrate.

Optionally, the display panel includes an array substrate, the array substrate includes a base substrate and a driving circuit arranged on the base substrate, and an elevation layer that is arranged on the display region and arranged between the driving circuit and the base substrate.

In a second aspect, the present disclosure provides a display device including the display panel of any one of the above.

In a third aspect, the present disclosure provides a method for manufacturing a display panel including a step of manufacturing a display region of a display panel, and a step of manufacturing a lens region of the display panel, wherein the lens region includes a common electrode and a deflection electrode that are arranged opposite each other, and a first liquid crystal layer arranged between the common electrode and the deflection electrode, the deflection electrode is configured for providing at least two different deflection voltages, and the at least two different deflection voltages are configured for deflecting the first liquid crystal layer.

Optionally, the step of manufacturing the display region of the display panel and the step of manufacturing the lens region of the display panel includes:

forming, on the display panel through a single patterning process, a display region common electrode and a lens electrode of the display panel, and the lens electrode of the display panel is either the common electrode or the deflection electrode.

Optionally, the step of manufacturing the lens region of the display panel includes:

arranging, between the lens region and the display region, an isolation structure for isolating liquid crystals; and subjecting the lens region to a One Drop Filling (ODF) process for the liquid crystals, to form the first liquid crystal layer.

Optionally, the arranging, between the lens region and the display region, the isolation structure for isolating the liquid crystals includes:

providing sealant for surrounding the lens region, to form the isolation structure; or forming a photo spacer on a region corresponding to the black matrix of the lens region, to form the isolation structure, and coating sealant on a side of the photo spacer distal to the first liquid crystal layer.

Optionally, the display panel includes an array substrate and a color filter substrate, and the step of manufacturing the lens region of the display panel includes:

subjecting, on a side of the array substrate, the first liquid crystal layer to an ODF process for a portion of the liquid crystals, and subjecting, on a side of the color filter substrate, the first liquid crystal layer to an ODF process for another portion of the liquid crystals.

As compared with the related art, according to the display panel, the manufacturing method thereof and the display device in the embodiments of the present disclosure, it may drive the liquid crystals to deflect, so as to achieve the function of zooming of the camera. In addition, the camera is integrated with the display panel, so as to improve the integration level of the display device, and facilitate the use and the manufacturing of the display device.

DETAILED DESCRIPTION

The present disclosure provides a display panel.

Figure 1:
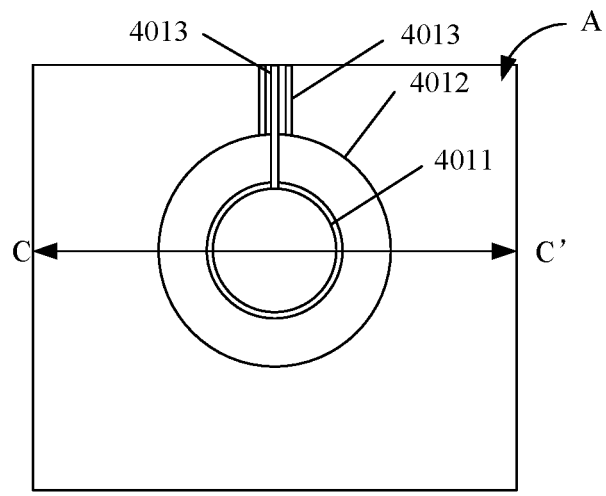
FIG. 1 is a structural diagram of a display panel according to an embodiment of the present disclosure.
Figure 2:
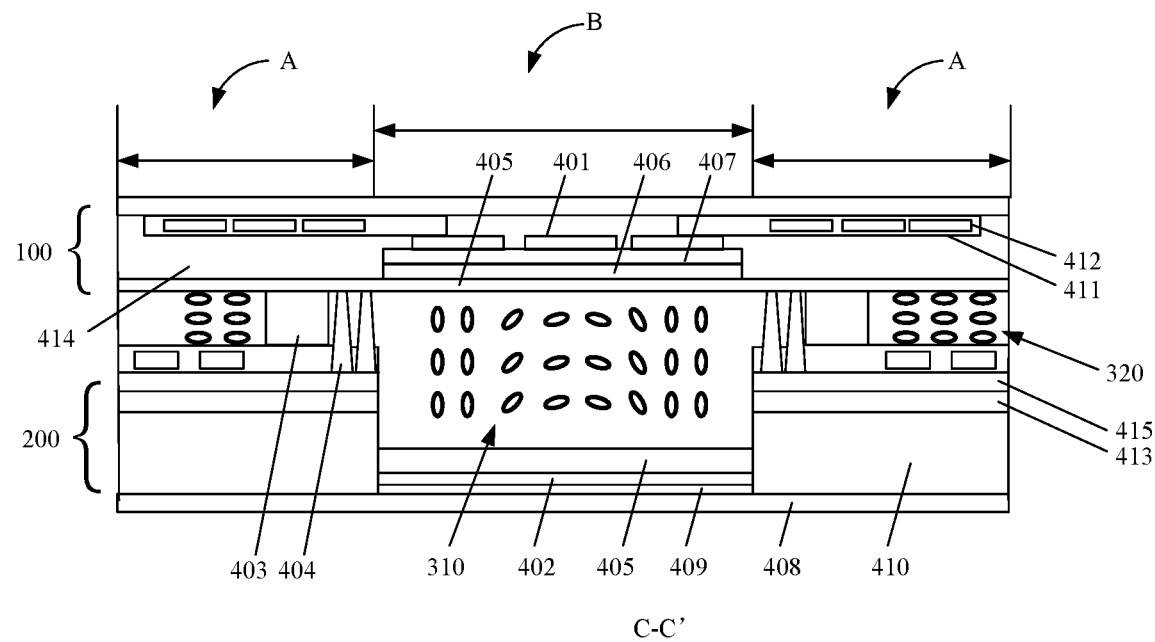
FIG. 2 is a cross-sectional view along a line C-C' in FIG. 1.

As shown in FIGS. 1 and 2, the display panel includes a display region A and a lens region B.

The display region A is configured for realizing a display function, and the lens region B functions as a liquid crystal lens, which can be used as a lens of a camera.

The lens region B includes a deflection electrode 401 and a common electrode 402 arranged opposite to each other, and a first liquid crystal layer 310 arranged between the common electrode 402 and the deflection electrode 401, the deflection electrode 401 being configured for providing at least two different deflection voltages, and the at least two different deflection voltages being configured for deflecting the first liquid crystal layer 310.

The liquid crystal lens uses the properties of the optical anisotropy and the electrical anisotropy of the liquid crystal molecules to drive, by a gradual change voltage, the liquid crystal molecules to form a gradual change arrangement. For example, the liquid crystal molecules may be in a hemispherical arrangement to provide a convex lens effect, or may be in a bowl-shaped arrangement to provide a concave lens effect, so as to implement the gradual change of the refractive index and realize the refraction of light.

The liquid crystal lens can utilize vertical electric field and plane electric field. The vertical electric field is typically used to control the liquid crystal molecules more conveniently. To achieve gradual change arrangement of the liquid crystal molecules, multiple electric fields of different values are required to implement the control.

When the deflection voltages are different, the degrees of deflections of the liquid crystal molecules are also different. Since the deflection electrode 401 is able to simultaneously provide at least two deflection voltages of different values, the at least two voltages function to drive at positive and negative frame frequencies respectively, whose frequencies are controlled to be typically at 0.5-10 KHz (Kilohertz).

By adjusting the values of the two voltages, continuous adjustment of the arrangement direction of the liquid crystal molecules can be achieved, i.e., continuous adjustments of a positive lens and a negative lens are achieved, and the zooming of the camera is achieved accordingly. Thus, the liquid crystal molecules in the first liquid crystal layer 310 can be deflected at different degrees, thereby achieving the refraction of the light and the lens zooming function of the camera.

In addition, the camera is integrated with the display panel, and an independent camera is not required, so as to improve the integration level of the display device, and facilitate the use and the manufacturing of the display device.

In some embodiments, the deflection electrode 401 includes a first sub-electrode 4011 and a second sub-electrode 4012 that are insulated from each other and spaced apart from each other, and the second sub-electrode 4012 is arranged around the first sub-electrode 4011. For example, the first sub-electrode 4011 may have a circle shape, and the second sub-electrode 4012 may have a ring shape.

When the first sub-electrode 4011 and the second sub-electrode 4012 provide deflection voltages with different values respectively, the degree of deflection of the liquid crystal molecule corresponding to the first sub-electrode 4011 and the degree of deflection of the liquid crystal molecule corresponding to the second sub-electrode 4012 are also different; and since the second sub-electrode 4012 is arranged around the first sub-electrode 4011, i.e., the degree of deflection of the central portion of the first liquid crystal layer 310 is different from the degree of deflection of the peripheral portion of the first liquid crystal layer 310, the different portions of the first liquid crystal layer 310 may have different light refraction effect, thereby achieving the light refraction effect of the lens.

In some embodiments, the number of deflector electrodes can be increased to further improve the control of the deflection of the liquid crystal molecules. For example, a ring deflector sub-electrode may be provided besides the second liquid electrode 4012 to provide a deflection voltage, so as to improve the accuracy of the deflection control for the first liquid crystal layer 310.

In some embodiments, the display region A of the display panel includes a second liquid crystal layer 320, the first liquid crystal layer 310 and the second liquid crystal layer 320 are arranged at a same layer, and the first liquid crystal layer 310 and the second liquid crystal layer 320 are separated by an isolation structure.

In order to facilitate production, in the embodiments of the present disclosure, the first liquid crystal layer 310 and the second liquid crystal layer 320 are arranged at a same layer, and it can be understood that the first liquid crystal layer 310 and the second liquid crystal layer 320 are located at the same layer in a direction parallel to the display panel, so that during the manufacturing process, the ODF process of the first liquid crystal layer 310 and the ODF process of the second liquid crystal layer 320 can be implemented in the same step, thus simplifying the manufacturing procedure.

Since the liquid crystals of the first liquid crystal layer 310 of the lens region B and the liquid crystals of the second liquid crystal layer 320 of the display region A are different, an isolation structure is arranged in the embodiments of the present disclosure to separate the first liquid crystal layer 310 from the second liquid crystal layer 320.

The first liquid crystal layer 310 may be made of any one of the liquid crystal materials in respective different modes, including but not limited to an ECB (Electrically Controlled Birefringence) mode, a VA (Vertically Aligned) mode, etc. For example, the first liquid crystal layer 310 may be made of the liquid crystal material in the ECB mode. In addition, the alignment direction of the first liquid crystal layer 310 may be same as that of display region A for ease of the utilization.

In the case where the first liquid crystal layer 310 and the second liquid crystal layer 320 adopt the same alignment direction, the initial TBA of the liquid crystal molecules of the first liquid crystal layer 310 is ~0.5°, but the present disclosure is not limited thereto. In addition, the deflection voltage provided by the deflection electrode 401 may be adjusted as needed to provide deflection driving forces with different values.

In some embodiments, the isolation structure includes a barrier formed by the sealant 403; and during the implementation, the barrier is formed by arranging the sealant 403 surrounding the lens region B, so as to prevent the liquid crystals from entering other regions.

In other embodiment, the isolation structure further includes a Photo Spacer 404 (PS), the photo spacer 404 being arranged at a side of the barrier proximate to the first liquid crystal layer 310.

During the implementation, firstly a photo spacer 404 surrounding the lens region B is provided to prevent the diffusion of the liquid crystals, and then the sealant 403 is provided as the side of the photo spacer 404 distal to the first liquid crystal layer 310 to improve the sealing and isolation effects for the liquid crystals.

In some embodiments of the present disclosure, the display panel includes the array substrate 200 and the color filter substrate 100 that are arranged oppositely to form a cell, and one of the common electrode 402 and the deflection electrode 401 is arranged on the array substrate 200 and the other is arranged on the color filter substrate 100.

Specifically, as shown in FIG. 2, in the embodiments of the present disclosure, the common electrode 402 is arranged on the array substrate 200, and the deflection electrode 401 is arranged on the color filter substrate 100; during the implementation, the deflection control for the first liquid crystal layer 310 can also be achieved by exchanging the positions of the two, i.e., the common electrode 402 is arranged on the color filter substrate 100 and the deflection electrode 401 is arranged on the array substrate 200.

It should be understood that the common electrode 402 and the deflection electrode 401 should be made of a transparent material, such as Indium Tin Oxide (ITO), since the lens region B needs to ensure light transmission.

At the positions between the deflection electrode 401 and the liquid crystal layer, and between the common electrode 402 and the liquid crystal layer, the Polyimide (PI) can be coated to form an orientation layer 405, and the Polyimide (PI) can be selected from an Oriented Attachment (OA) type or a rubbing type. Considering that there is a gap between the lens region B and the display region A, the OA orientation is more preferable.

Further, it is also necessary to form a high-impedance layer 406 and a first insulation layer 407 between the alignment layer 405 and the lens electrode, the high-impedance layer 406 is configured for smoothing the electric field, the thicknesses of the high-impedance layer 406 may be in a range from 0.4 to 2 microns, the high-impedance layer 406 and the first insulation layer 407 may be formed on either the side of the color filter substrate 100 or the side of the array substrate 200.

As shown in FIG. 2, in the embodiments of the present disclosure, the high-impedance layer 406 and the first insulation layer 407 may be formed on the side of the color filter substrate 100.

A first insulation layer 407 needs to be provided between the high-impedance layer 406 and the lens electrode. For example, the first insulation layer 407 may be made of silicon oxide.

Here, the lens electrode refers to the common electrode 402 and the deflection electrode 401 of the liquid crystal lens, and the lens electrode on the array substrate 200 refers to one of the common electrode 402 and the deflection electrode 401 that is arranged on the array substrate 200.

Further, a second insulation layer 409 is provided between the lens electrode of the array substrate 200 and the transparent base 408. In the embodiment shown in FIG. 2, the lens electrode of the array substrate 200 specifically refers to the common electrode 402.

In some embodiments, the arrange substrate 200 further includes a display region common electrode 413 arranged on the display region A, and the common electrode 402 and the lens electrode arranged on the array substrate 200 may be made of a same material and arranged at a same layer.

Specifically, in an example where the common electrode 402 is arranged on the array substrate 200, the common electrode 402 and the display region common electrode 413 are arranged at the same layer and made of the same material. In practice, the formations of the common electrode 402 and the display region common electrode 413 of the lens region B may be implemented through a single patterning process.

When the deflection electrode 401 is arranged on the array substrate 200, the deflection electrode 401 and the display region common electrode 413 are arranged at the same layer and made of the same material, only the structure of the mask needs to be adjusted accordingly, which will not be further described in detail herein.

In some embodiments, the display panel further includes an electrode line 4013 and a black matrix 411 arranged on the color filter substrate 100, the common electrode 402 and/or the deflection electrode 401 is electrically connected to the electrode line 4013, the orthographic projection of the electrode line 4013 on the color filter substrate 100 is within the orthographic projection of the black matrix 411 on the color filter substrate 100.

During the implementation, the positions of the electrode lines 4013 may be adjusted according to the number of the electrode lines 4013 and the width of the electrode line 4013, so as to cover the electrode line 4013 by the black matrix 411, and prevent the electrode line 4013 from shielding the opening region of the display panel, which may reduce the adverse influence on the display effect.

In some embodiments, the lens region B is of a square region having a width of 5 to 15 mm, wherein the aperture portion of the lens is of a circle with approximate 1.5 to 8 mm. Obviously, the size and shape thereof are not limited thereto, and may be further adjusted according to actual needs.

The aperture portion is the transparent region of the lens region B, and the external region is controlled to be covered by the black matrix 411. The electrode line 4013 extends out of the edge of the light-transmitting area and extends to the region covered by the black matrix 411, and the number of the electrode lines 4013 can be adjusted and selected according to the width of the wiring area and the width of each electrode line 4013, which is not further defined and described herein.

In some embodiments, a display panel includes an array substrate 200, the array substrate 200 includes a transparent base 408 and a driving circuit arranged on the transparent base 408, and an elevation layer 410 is provided between the driving circuit and the transparent base 408.

It should be understood that the liquid crystal cell of the lens region B is relatively thick. In general, the cell thickness of the liquid crystal cell of the lens region B may be around 8 to 30 microns, while the cell thickness of the liquid crystal cell of the display region A is typically less than 3.5 microns. In order to improve the consistency of the processes, in the portion of the array substrate 200 corresponding to the display region A, an elevation layer 410 is formed before the formation of the driving circuit layer, wherein the thickness of each layer in the elevation layer 410 can be controlled to be at 4-8 microns, and an appropriate number of elevation layers 410 may be selected to compensate for the thicknesses of the display region A.

During the implementation, one or more elevation layers 410 are formed on the array substrate 200, and then a driving circuit layer is further formed on the elevation layers 410, so that the thicknesses of the display region A and the lens region B are substantially consistent.

In addition, for example, a flat layer 414 and a protective layer 415 may be further formed the display region A if required, which can refer to the prior art and will not be further described in detail herein.

Furthermore, in order to further satisfy the thickness of the lens region B, a photo spacer 404 can be further provided on the portion of the lens region B shielded by the black matrix 411, and at the same time, the thicknesses of the photo spacer 404 of the lens region B and the height of the photo spacer 404 of the lens region A can be kept consistent. In addition, a pixel structure 412 is also formed in that region, which is coated with Overcoating (OC). Since the pixel structure is located in the region covered by the black matrix 411, the pixel of the region does not have a display function, but is mainly configured for supporting the thickness of the cell, and maintaining the consistency of the thickness of the lens region B and the thickness of the display region A.

In the aperture region of the lens region B, there is no need to provide a pixel structure, and the OC may or may not be coated on the color filter substrate 100 of the aperture region.

In a second aspect, the present disclosure provides a display device including the display panel of any one of the above.

Since the display device of the embodiments of the present disclosure includes all the technical features of the above-mentioned display panel, at least all the above-mentioned technical effects can be achieved, which will not be further described in detail herein.

In a third aspect, the present disclosure provides a manufacturing method for a display panel, including a step of manufacturing a display region A of the display panel and a step of manufacturing a lens region B of the display panel, wherein the manufactured display panel is any one of the above-mentioned display panels and can achieve the same or similar technical effects, which will not be further described in detail herein.

In some embodiments, the step of manufacturing the display region of the display panel A and the step of manufacturing the lens region B of the display panel includes:
  forming, on an array substrate 200, a display region common electrode 413 located in the display panel and the lens electrode of the display panel through a single patterning process, the lens electrode of the display panel being either one of the common electrode 402 and the deflection electrode 401.

Here, the lens electrode refers to the common electrode 402 and the deflection electrode 401 of the liquid crystal lens, and the lens electrode on the array substrate 200 refers to one of the common electrode 402 and the deflection electrode 401 that is arranged on the array substrate 200 in.

For example, if the common electrode 402 is arranged on the array substrate 200, the lens electrode on the array substrate 200 refers to the common electrode 402, and if the deflection electrode 401 is arranged on the array substrate 200, the lens electrode on the array substrate 200 refers to the deflection electrode 401.

During the implementation, manufacturing the display region common electrode 413 and the electrode of the lens region B through the single patterning process may reduce the number of the manufacturing procedures and the number of the masks to be used, and save the manufacturing cost.

In some embodiments, the step of manufacturing the lens region B of the display panel includes:
  arranging, between the lens region B and the display region A, an isolation structure for isolating liquid crystals; and
  subjecting the lens region B to an ODF process for the liquid crystals, to form the first liquid crystal layer 310.

Since the first liquid crystal layer 310 and the second liquid crystal layer 320 utilize respective different liquid crystals, and they utilize separate drippers, which is more convenient for controlling the dripping of the liquid crystals.

In the embodiments of the present disclosure, firstly the isolation structure is arranged, and then the lens region B is subjected to the ODF process for the liquid crystals, to form the first liquid crystal layer 310, and the diffusion of first liquid crystal layer 310 can be prevented through by the isolation structure.

In some embodiments, the arranging, between the lens region B and the display region A, an isolation structure for isolating liquid crystals includes:
  providing sealant 403 for surrounding the lens region, to form the isolation structure; or
  forming a photo spacer 404 on a region corresponding to the black matrix 411 of the lens region B, to form the isolation structure, and coating sealant 403 on a side of the photo spacer 404 distal to the first liquid crystal layer 310.

The isolation structure can be made of the sealant 403 or the photo spacer 404, and obviously, the two can also be used in combination, i.e., the isolation structure is formed by the photo spacer 404, and then the sealant 403 is further coated to improve the isolation and sealing effect.

In some embodiments, the display panel includes an array substrate 200 and a color filter substrate 100, and the step of manufacturing a lens region B of the display panel includes:
  subjecting, on a side of the first liquid crystal layer 310 proximate to the array substrate 200, the first liquid crystal layer 310 to an ODF process for a portion of the liquid crystals, and subjecting, on a side of the first liquid crystal layer 310 proximate to the color filter substrate 100, the first liquid crystal layer 310 to the ODF process for another portion of the liquid crystals.

In some other embodiments, a portion of liquid crystals is instilled on the side of array substrate 200, and the other portion of liquid crystals is instilled on the side of the color filter substrate 100, so as to reduce the number of liquid crystals on the single side and shorten the diffusion distance of the liquid crystals.

The above are only specific embodiments of the present disclosure, but the protection scope of the present disclosure is not limited thereto, and any person skilled in the art familiar with the present technical field can easily conceive changes or substitutions within the technical scope disclosed in the present disclosure, and all of these should be included in the protection scope of the present disclosure. Accordingly, the protection scope of the present disclosure should be subject to the protection scope of the claims.

What is claimed is:
1. A display panel, comprising: a display region and a lens region, wherein the lens region comprises a common electrode and a deflection electrode arranged opposite each other, and a first liquid crystal layer arranged between the common electrode and the deflection electrode, the deflection electrode is configured for providing at least two different deflection voltages, and the at least two different deflection voltages are configured for deflecting the first liquid crystal layer, wherein the display region of the display panel comprises a second liquid crystal layer, the first liquid crystal layer and the second liquid crystal layer are arranged at a same layer, and the first liquid crystal layer and the second liquid crystal layer are separated from each other by an isolation structure, wherein the isolation structure comprises a barrier that is made of sealant, wherein the isolation structure further comprises a photo spacer that is arranged at a side of the barrier proximate to the first liquid crystal layer.

2. The display panel according to claim 1, wherein the deflection electrode comprises a first sub-electrode and a second sub-electrode that are insulated from each other and spaced apart from each other, and the second sub-electrode is arranged around the first sub-electrode.

3. The display panel according to claim 2, wherein the first sub-electrode is of a circle, and the second sub-electrode is of a ring.

4. The display panel according to claim 1, wherein the display panel comprises an array substrate and a color filter substrate that are arranged oppositely to form a cell, one of the common electrode and the deflection electrode is arranged on the array substrate, and the other one of the common electrode and the deflection electrode is arranged on the color filter substrate.

5. The display panel according to claim 4, wherein the array substrate further comprises a display region common electrode arranged on the display region;
the common electrode is arranged on the array substrate, and the common electrode and the display region common electrode are arranged at a same layer and made of a same material; or
the deflection electrode is arranged on the array substrate, and the deflection electrode and the display region common electrode are arranged at a same layer and made of a same material.

6. The display panel according to claim 1, wherein the display panel further comprises a black matrix and an electrode line that are arranged on a color filter substrate, the common electrode and/or the deflection electrode is electrically connected to the electrode line, and an orthographic projection of the electrode line onto the color filter substrate is within a range of an orthographic projection of the black matrix onto the color filter substrate.

7. The display panel according to claim 1, wherein the display panel comprises an array substrate, the array substrate comprises a base substrate and a driving circuit arranged on the base substrate, and an elevation layer that is arranged on the display region and arranged between the driving circuit and the base substrate.

8. The display panel according to claim 1, wherein the lens region further comprises a high impedance layer and a first insulation layer, the first insulation layer is arranged at a side of a lens electrode proximate to the first liquid crystal layer, the high impedance layer is arranged at a side of the first insulation layer proximate to the first liquid crystal layer, and the lens electrode is the deflection electrode or the common electrode.

9. A display device, comprising the display panel according to claim 1.

10. The display device according to claim 9, wherein the deflection electrode comprises a first sub-electrode and a second sub-electrode that are insulated from each other and spaced apart from each other, and the second sub-electrode is arranged around the first sub-electrode.

11. The display device according to claim 10, wherein the first sub-electrode is of a circle, and the second sub-electrode is of a ring.

12. A method for manufacturing the display panel according to claim 1, comprising: a step of manufacturing the display region of the display panel, and a step of manufacturing the lens region of the display panel,
wherein the step of manufacturing the lens region of the display panel comprises:
arranging, between the lens region and the display region, the isolation structure for isolating liquid crystals; and
subjecting the lens region to an One Drop Filling (ODF) process for the liquid crystals, to form the first liquid crystal layer,
wherein the arranging, between the lens region and the display region, the isolation structure for isolating the liquid crystals comprises:
providing sealant for surrounding the lens region, to form the isolation structure; or
forming the photo spacer on a region corresponding to the black matrix of the lens region, to form the isolation structure, and coating the sealant on a side of the photo spacer distal to the first liquid crystal layer.

13. The method according to claim 12, wherein the step of manufacturing the display region of the display panel and the step of manufacturing the lens region of the display panel comprises:
forming, on the display panel through a single patterning process, a display region common electrode and a lens electrode of the display panel, and the lens electrode of the display panel is either the common electrode or the deflection electrode.

14. The method according to claim 12, wherein the display panel comprises an array substrate and a color filter substrate, and the step of subjecting the lens region to the ODF process for the liquid crystals comprises:
applying, through the ODF process, a portion of the liquid crystals to a first side of a first layer between the common electrode and the deflection electrode, and applying, through the ODF process, another portion of the liquid crystals to a second side of the first layer, to cause the first layer to be the first liquid crystal layer, wherein the first side of the first layer is proximate to the array substrate, and the second side of the first layer is proximate to the color filter substrate.

* * * * *